US012698021B1

(12) United States Patent
Alferness et al.

(10) Patent No.:    US 12,698,021 B1
(45) Date of Patent:         Aug. 4, 2026

(54) SYSTEMS AND METHODS OF WHEEL BASED POWER GENERATION FOR ELECTRONIC COMPONENTS ON RETAIL CARTS

(71) Applicant: Walmart Apollo, LLC, Bentonville, AR (US)

(72) Inventors: Jon Alferness, San Francisco, CA (US); Andrew J. Grignon, Roseville, CA (US); Darrell Whitelaw, Pacific Palisades, CA (US); Matthew S. Brown, Kinnelon, NJ (US); William J. Yergin, San Jose, CA (US); Ankoor-Anish K. Hazari, Castro Valley, CA (US); Brittany N. Leek, Waterford, MI (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/042,675

(22) Filed: Jan. 31, 2025

(51) Int. Cl.
 *B62B 3/00* (2006.01)
 *B62B 3/14* (2006.01)
 *H02K 47/04* (2006.01)

(52) U.S. Cl.
 CPC ........... *B62B 3/1492* (2013.01); *H02K 47/04* (2013.01); *B62B 2301/04* (2013.01)

(58) Field of Classification Search
 CPC .... H02K 7/1846; H02K 47/04; B62B 3/1424; B62B 3/1492; B62B 2301/04
 See application file for complete search history.

(56) References Cited

U.S. PATENT DOCUMENTS 3,311,197 A    3/1967  Lachance
4,771,840 A    9/1988  Keller
        (Continued)

FOREIGN PATENT DOCUMENTS

CN        203974876 U    12/2012
CN        104908792 A     9/2015
        (Continued)

OTHER PUBLICATIONS

Ecofriend; "Eco Gadgets: E-Cart aims to power a supermarket by harnessing kinetic energy", http://www.ecofriend.com/eco-gadgets-ecart-aims-to-power-a-supermarket-by-harnessing-kinetic-energy.html, printed Nov. 6, 2015, pp. 1-5.
        (Continued)

*Primary Examiner* — Julio C. Gonzalez
(74) *Attorney, Agent, or Firm* — Fitch, Even, Tabin & Flannery, LLP

(57)        ABSTRACT
In some embodiments, apparatuses and methods are provided herein useful to wheel-based power generation on a cart for transporting commercial products. In some embodiments, a system may include at least one wheel that rotates in multiple directions; a first shaft coupled to the at least one wheel; a rotation transmitter coupled to the at least one wheel and the first shaft; a first gear coupled to the first shaft; a second gear coupled to the first gear; a second shaft coupled to the second gear; and a generator coupled to the second shaft to generate power by converting rotation of the at least one wheel into an alternating current power output. The system may include a control unit coupled to the generator to convert the alternating current power output into a direct current power, and a power storage component coupled to the generator, to store the direct current power output.

18 Claims, 9 Drawing Sheets

(56) References Cited

U.S. PATENT DOCUMENTS

| | | | |
|---|---|---|---|
| 4,807,716 A | 2/1989 | Hawkins | |
| 5,072,956 A | 12/1991 | Tannehill | |
| 5,284,218 A | 2/1994 | Rusher, Jr. | |
| 5,657,828 A | 8/1997 | Nagamachi | |
| 6,390,213 B1 | 5/2002 | Bleicher | |
| 6,687,581 B2 | 2/2004 | Deguchi | |
| 6,928,343 B2 | 8/2005 | Cato | |
| 7,009,111 B1 | 3/2006 | Rintz | |
| 7,096,727 B2 | 8/2006 | Adamson | |
| 7,225,980 B2 | 6/2007 | Ku | |
| 7,350,607 B2 * | 4/2008 | Park | H02J 7/1407 |
| | | | 280/37 |
| 7,562,729 B2 | 7/2009 | Hammerle | |
| 7,789,187 B2 | 9/2010 | Zerhusen | |
| 8,120,190 B2 * | 2/2012 | Bravo | H02J 7/02 |
| | | | 290/1 R |
| 8,193,650 B2 | 6/2012 | Thorne | |
| 8,820,447 B2 | 9/2014 | Carter | |
| 9,008,882 B2 | 4/2015 | Yamamoto | |
| 9,120,657 B1 | 9/2015 | Turner | |
| 9,365,129 B2 | 6/2016 | Kikuchi | |
| 9,403,548 B2 | 8/2016 | Hannah | |
| 9,796,402 B1 | 10/2017 | Suarez | |
| 10,124,821 B2 | 11/2018 | Hannah | |
| 10,164,451 B2 | 12/2018 | Jones | |
| 10,326,300 B2 * | 6/2019 | Jones | H02J 7/1407 |
| 10,601,243 B2 | 3/2020 | Jones | |
| 11,863,007 B1 | 1/2024 | Zhou | |
| 2004/0130159 A1 * | 7/2004 | Brandon | B60K 6/46 |
| | | | 290/40 C |
| 2006/0249320 A1 | 11/2006 | Carter | |
| 2007/0090702 A1 * | 4/2007 | Schiller | A45C 15/00 |
| | | | 280/655 |
| 2008/0041644 A1 | 2/2008 | Tudek | |
| 2008/0122227 A1 | 5/2008 | Hammerle | |
| 2008/0183347 A1 | 7/2008 | Miki | |
| 2009/0315302 A1 | 12/2009 | Gray | |
| 2010/0025124 A1 | 2/2010 | Arpino | |
| 2010/0078903 A1 | 4/2010 | Bravo | |
| 2010/0148582 A1 | 6/2010 | Carter | |
| 2011/0313613 A1 | 12/2011 | Kawahara | |
| 2012/0115071 A1 | 5/2012 | Fleury | |
| 2012/0138375 A1 | 6/2012 | Hughes | |
| 2013/0333961 A1 | 12/2013 | O'Donnell | |
| 2014/0097676 A1 | 4/2014 | Kusumi | |
| 2016/0023675 A1 | 1/2016 | Hannah | |
| 2016/0063534 A1 | 3/2016 | Aziz | |
| 2016/0137185 A1 | 5/2016 | Morisaki | |
| 2017/0001656 A1 | 1/2017 | Katayama | |
| 2017/0066464 A1 | 3/2017 | Carter | |
| 2017/0101120 A1 | 4/2017 | Hannah | |
| 2017/0174187 A1 | 6/2017 | Jones | |
| 2017/0214262 A1 | 7/2017 | Jones | |
| 2017/0229903 A1 | 8/2017 | Jones | |
| 2018/0162432 A1 | 6/2018 | Jones | |
| 2018/0162433 A1 | 6/2018 | Jones | |

FOREIGN PATENT DOCUMENTS

| | | |
|---|---|---|
| EP | 1863656 B1 | 1/2018 |
| JP | 2010204999 A | 9/2010 |
| WO | 2013092258 | 6/2013 |

OTHER PUBLICATIONS

Henderson, Tessa; "Power generating trolley"; <https://www.offgridenergyindependence.com/articles/2657/power-generating-trolley>; Sep. 29, 2010; pp. 1-7.

Seth, Radhika; "Current Cart"; <https://www.yankodesign.com/2009/12/08/current-cart/>; Dec. 8, 2009; pp. 1-6.

Seth, Radhika; "Current Cart"; http://www.yankodesign.com/2009/12/08/current-cart/; Dec. 8, 2009; pp. 1-21.

USPTO; U.S. Appl. No. 15/410,185; Non-Final Rejection mailed Jun. 7, 2018; (14 pages).

USPTO; U.S. Appl. No. 15/410,185; Notice of Allowance mailed Jan. 10, 2019; (10 pages).

* cited by examiner

FIG. 9

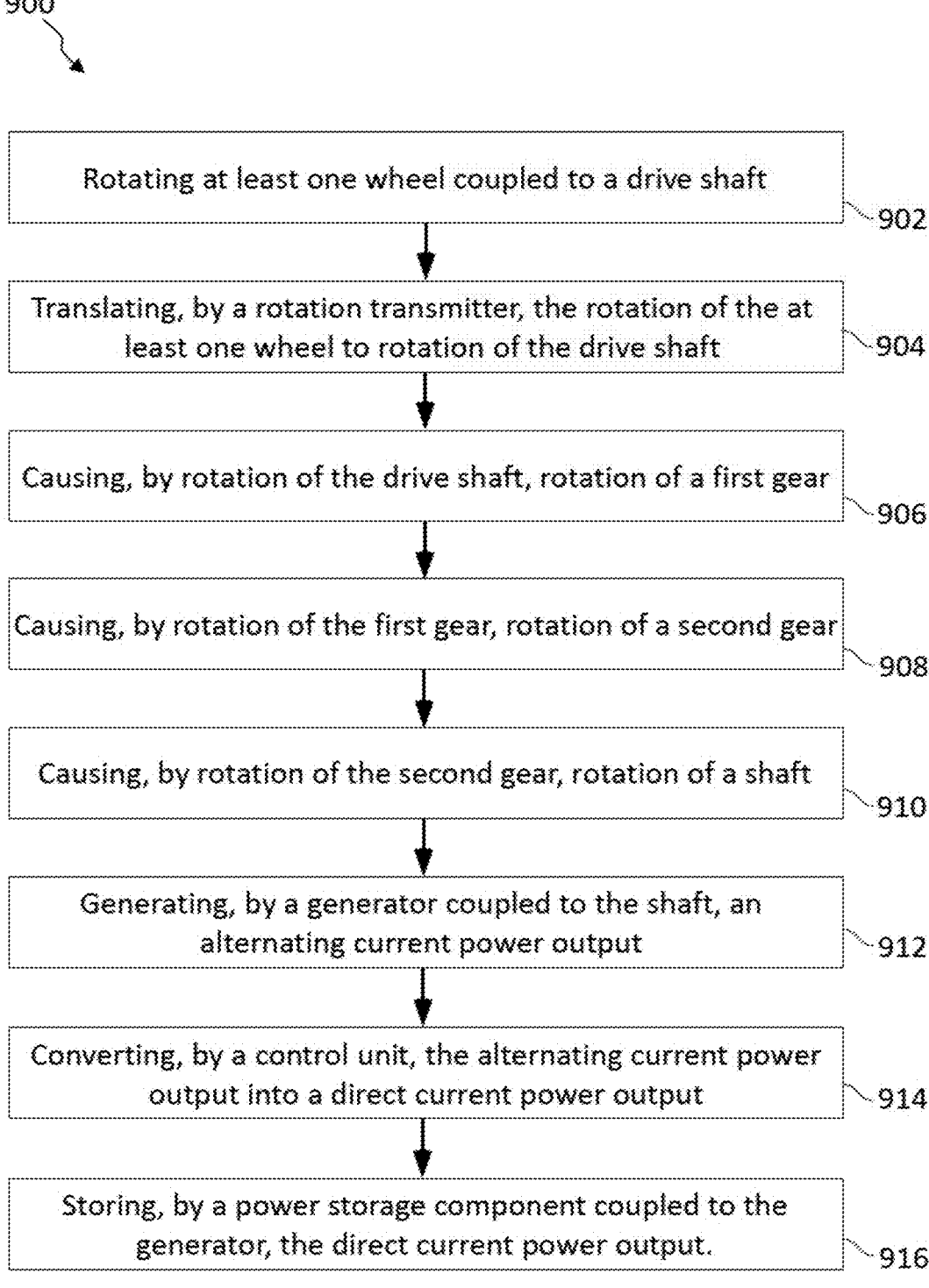

900

Rotating at least one wheel coupled to a drive shaft — 902

↓

Translating, by a rotation transmitter, the rotation of the at least one wheel to rotation of the drive shaft — 904

↓

Causing, by rotation of the drive shaft, rotation of a first gear — 906

↓

Causing, by rotation of the first gear, rotation of a second gear — 908

↓

Causing, by rotation of the second gear, rotation of a shaft — 910

↓

Generating, by a generator coupled to the shaft, an alternating current power output — 912

↓

Converting, by a control unit, the alternating current power output into a direct current power output — 914

↓

Storing, by a power storage component coupled to the generator, the direct current power output. — 916

SYSTEMS AND METHODS OF WHEEL BASED POWER GENERATION FOR ELECTRONIC COMPONENTS ON RETAIL CARTS

TECHNICAL FIELD

This disclosure relates generally to retail carts within a retail facility and, more particularly, to generation of power for electronic components of the retail carts.

BACKGROUND

Many retail processes utilize electronic components (e.g., mobile devices, printers, scanners, etc.) which can require extensive time dedicated to charging the electronic devices. The process of swapping out electronic components that require charging for fully charged electronic components can decrease the overall efficiency of a specific retail process as additional time is required to replace the components. Generating power directly on a cart including electronic components that is used during a retail process allows the electronic components to be charged during use, which can improve efficiency. On conventional carts, wheel-based power generation is limited in terms of the amount of power generated by movement of a cart, which can subsequently limit the amount of power available to charge electronic components. As such, a need exists for systems and methods that can optimize wheel-based power generation for charging electronic components on retail carts.

BRIEF DESCRIPTION OF DRAWINGS

Disclosed herein are embodiments of systems, apparatuses and methods pertaining to wheel-based power generation on a cart for transporting commercial products. This description includes drawings, wherein:

FIG. 9 is a block diagram of a method of wheel-based power generation in accordance with some embodiments.

Figure 1:
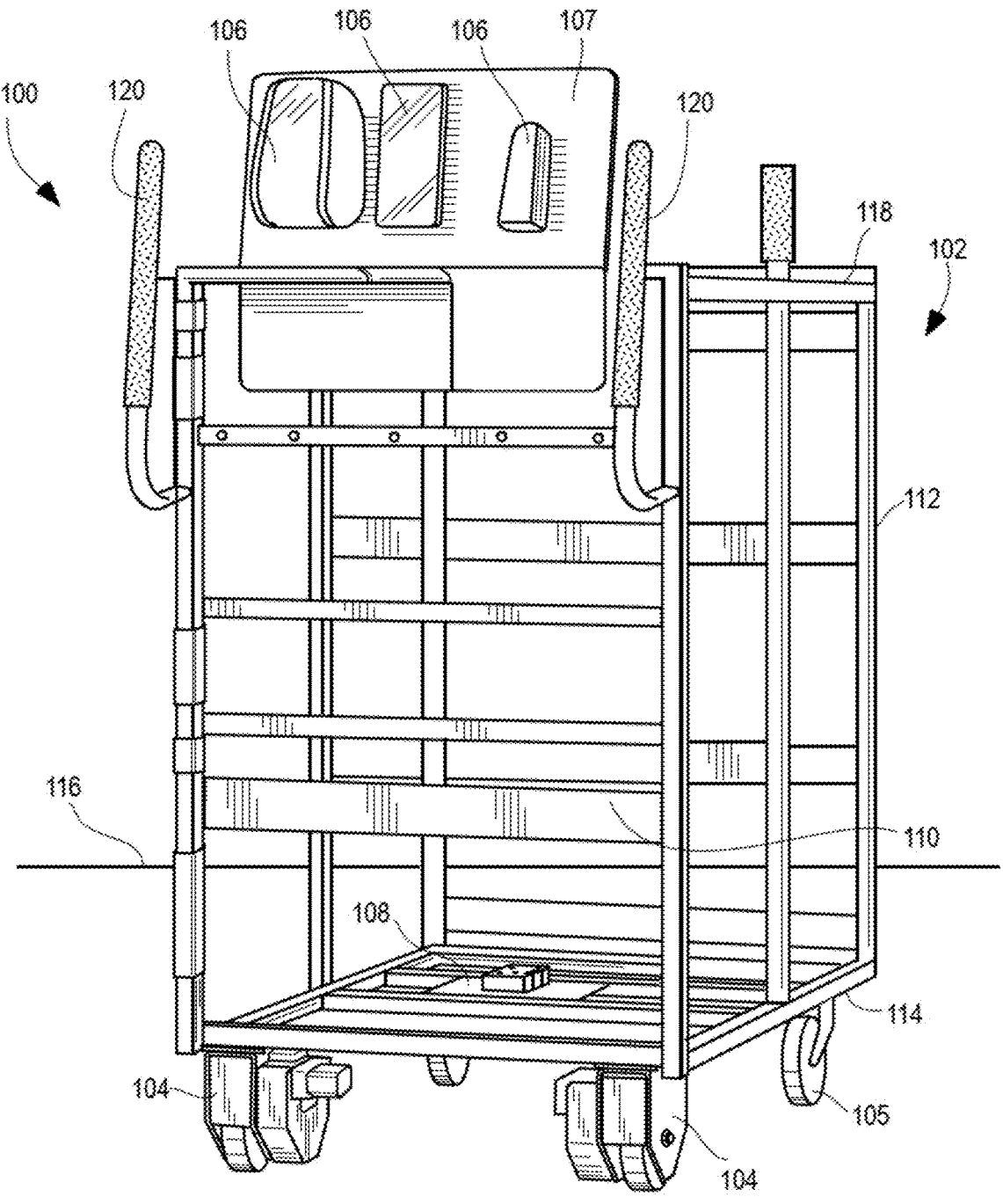
FIG. 1 is a front perspective view of a retail cart in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of example embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to wheel-based power generation on a cart for transporting commercial products and include: at least one wheel that rotates in multiple directions including a first direction and a second direction opposite of the first direction; a first shaft, wherein the at least one wheel is coupled to the first shaft, and wherein rotation of the at least one wheel causes rotation of the first shaft; a rotation transmitter coupled to the at least one wheel and the first shaft, wherein the rotation transmitter translates the rotation of the at least one wheel into the rotation of the first shaft; a first gear coupled to the first shaft, wherein the rotation of the first shaft causes rotation of the first gear; a second gear coupled to the first gear such that the rotation of the first gear causes rotation of the second gear; a second shaft coupled to the second gear, wherein the rotation of the second gear causes rotation of the second shaft; a generator coupled to the second shaft, wherein the generator generates power by converting the rotation of the second shaft into an alternating current power output when the rotation of the at least one wheel is present; a control unit coupled to the generator, wherein the control unit converts the alternating current power output into a direct current power output; and a power storage component coupled to the generator, wherein the power storage component stores the direct current power output.

In some embodiments, a method of wheel-based power generation on a cart for transporting commercial products includes: rotating at least one wheel, wherein the at least one wheel rotates in multiple directions including a first direction and a second direction opposite of the first direction, and wherein the at least one wheel is coupled to a first shaft such that rotation of the at least one wheel causes rotation of the first shaft; translating, by a rotation transmitter coupled to the at least one wheel, the rotation of the at least one wheel into the rotation of the first shaft; causing, by the rotation of the first shaft, rotation of a first gear coupled to the first shaft; causing, by the rotation of the first gear, rotation of a second gear coupled to the first gear; causing, by rotation of the second gear, rotation of a second shaft coupled to the second gear; generating, by a generator coupled to the second shaft, power by converting the rotation of the second shaft into an alternating current power output when rotation of the at least one wheel is present; converting, by a control unit coupled to the generator, the alternating current power output into a direct current power output; and storing, by a power storage component coupled to the generator, the direct current power output.

Figure 2:
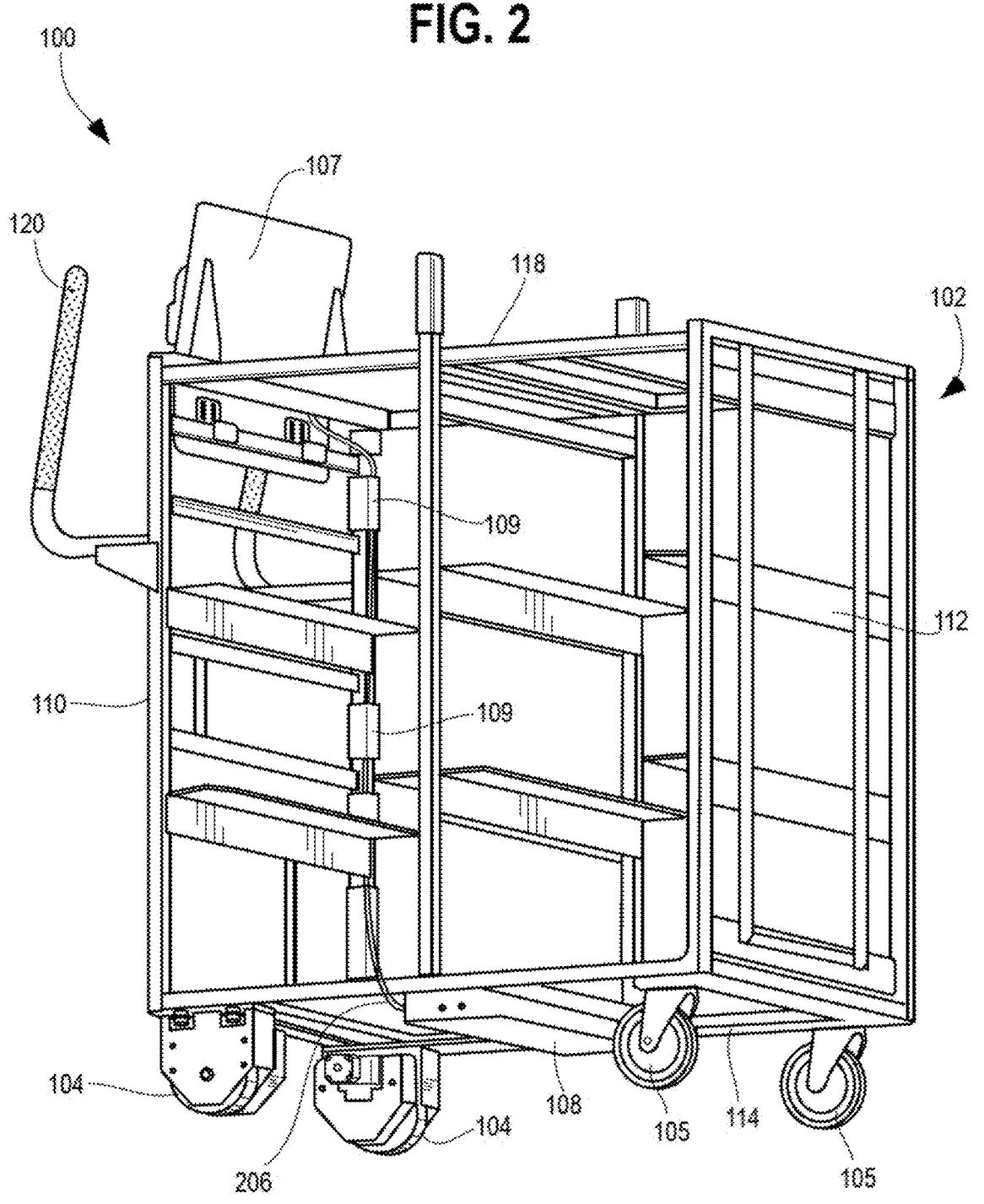
FIG. 2 is a back perspective view of a retail cart in accordance with several embodiments.

FIGS. 1 and 2 illustrate a system 100 of wheel-based power generation on a cart 102 for charging one or more electronic devices 106 coupled to the cart 102 in accordance with some embodiments. In some embodiments, the cart 102 may be a retail cart usable within a retail facility. The retail facility may be any retail facility where retail and/or commercial products are stored and/or transported, such as an order fulfillment facility, a distribution center, a retail store, etc., which may utilize carts 102. In some embodiments, the cart 102 may be a shopping cart used by a customer (i.e., in a retail store) and/or may be a utility cart used by an associate (i.e., in a retail store, an order fulfillment facility and/or a distribution center).

In some aspects, the cart 102 may be used to hold and transport products at the retail facility (e.g., during order fulfillment), and the electronic devices 106 may be mounted to and used in cooperation with the cart 102 during a shopping and/or order fulfillment process. The cart 102 may include any combination of baskets, shelves, flatbeds, etc., that stores products and/or couple to various components of the cart 102. In some embodiments, the cart 102 includes additional features that assist an associate during order fulfillment, for example, features including bags, labels, printer paper, etc.

The cart 102 may include any number of insert features (e.g., protrusions, external features, etc.) and/or receiving features (e.g., apertures, recesses, etc.) that facilitate the coupling of additional components to the cart 102 by any suitable coupling means. In some embodiments, the cart 102 may include a specific mounting for one or more electronic devices 106 and/or alternate components that may be coupled to the cart 102. FIG. 2 shows that the cart 102 includes a control unit 108, at least one wheel 104, and one or more electronic devices 106 coupled to the cart 102.

In some embodiments, the cart 102 includes at least one wheel 104 that generates power during rotation of the at least one wheel 104. In some aspects, the cart 102 is further coupled to at least one additional wheel 105 that does not generate power during rotation of the at least one additional wheel 105. While the embodiments in FIGS. 1 and 2 show the cart 102 with two wheels 104 that generate power and are disposed on opposite ends adjacent a front side 110 of the cart 102 on a bottom side 114 of the cart 102, and with two additional wheels 105 that do not generate power on opposite ends adjacent a back side 112 of the cart 102 on the bottom side 114 of the cart 102, it is generally understood that any suitable configuration, combination, location, number, etc., of power generating wheels 104 and non-power generating wheels 105 may be used. In some embodiments, the wheels 104, 105 may be any suitable wheel of any suitable material, diameter, width, etc., such as a caster wheel.

The cart 102 may move via the wheels 104 such that rotation of the wheels 104 moves the cart and causes the charging of the electronic devices 106 coupled to the cart 102. In some embodiments, movement of the cart 102 causes the rotation of the wheels 104. The wheels 104, 105 are disposed generally adjacent the bottom side 114 of the cart 102 such that the wheels 104, 105 are in contact with a supporting surface 116 (e.g., a floor of the retail facility), and such that the wheels 104, 105 and the cart 102 move across the supporting surface 116 in response to an external force applied to the cart 102. Generally, the cart 102 moves via the wheels 104, 105, and the movement of the cart 102 by an external force (i.e., an associate and/or customer pushing or pulling a cart) causes rotation of the wheels 104, 105. In some aspects, the wheels 104, 105 rotate in multiple directions including a first direction and a second direction opposite of the first direction. In some embodiments, the wheels 104, 105 additionally swivel and/or turn to steer and/or turn the cart 102. In some aspects, the wheels 104, 105 may include a motor which drives rotation of the wheels 104, 105, and the cart 102 may be moved by any combination of external forces and motorized forces from the motor. In some embodiments, the cart 102 includes handles 120 to be gripped and pushed or pulled by a user in order to move the cart 102. While FIGS. 1 and 2 show two handles 120 extending outwards and upwards from the front side 110 of the cart 102 adjacent a top side 118 of the cart 102, it is generally understood that any alternate suitable configuration, placement, and/or number of handles 120 may be used.

In some embodiments, the electronic devices 106 mounted to the cart 102 may be any kind of electronic device 106 useful to an associate and/or customer during order fulfillment and/or shopping, respectively. In the embodiment shown in FIG. 1, the electronic devices 106 are mounted on a component mount 107 that facilitates the mounting of the electronic devices 106 directly to the cart 102. In the illustrated embodiment, the electronic devices 106 and the component mount 107 are disposed on the front side 110 of the cart 102 adjacent the top side 118 of the cart 102. In some aspects, electronic devices 106 may include any combination of label printers, barcode scanners, smartphones, tablets, etc.

Figure 8:
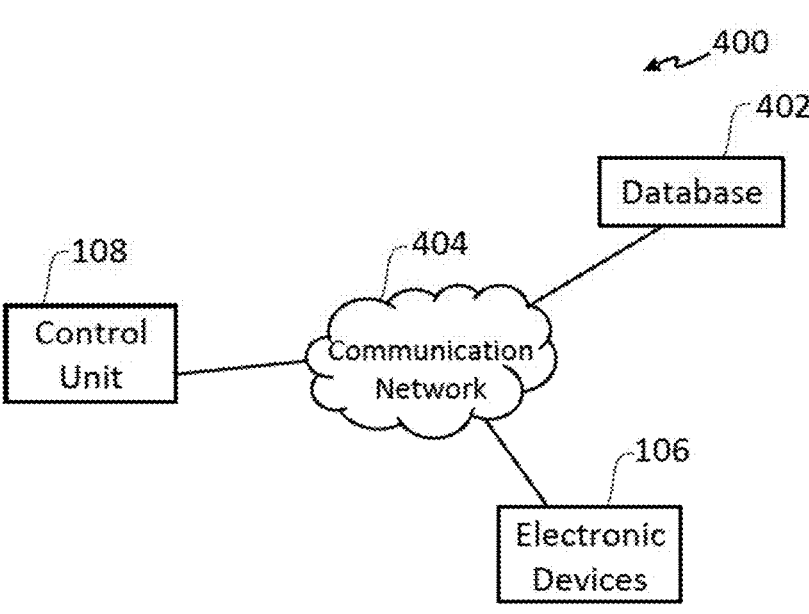
FIG. 8 is a block diagram of components of a power generation system in accordance with several embodiments.

In some embodiments, the electronic devices 106 may be connected to at least one electronic database over a communication network (such as the electronic database 402 and the communication network 404 shown in FIG. 8). The electronic database 402 may include product information, order information, and/or any alternate information that may be used by an associate in conjunction with loading retail products onto the cart 102, transporting retail products using the cart 102, and/or unloading the products from the cart 102. The electronic devices 106 may each include any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The electronic devices 106 may (for example, by using corresponding programming stored in a memory as will be well understood by those skilled in the art) conduct one or more of the steps, actions, and/or functions described herein.

Figure 3:
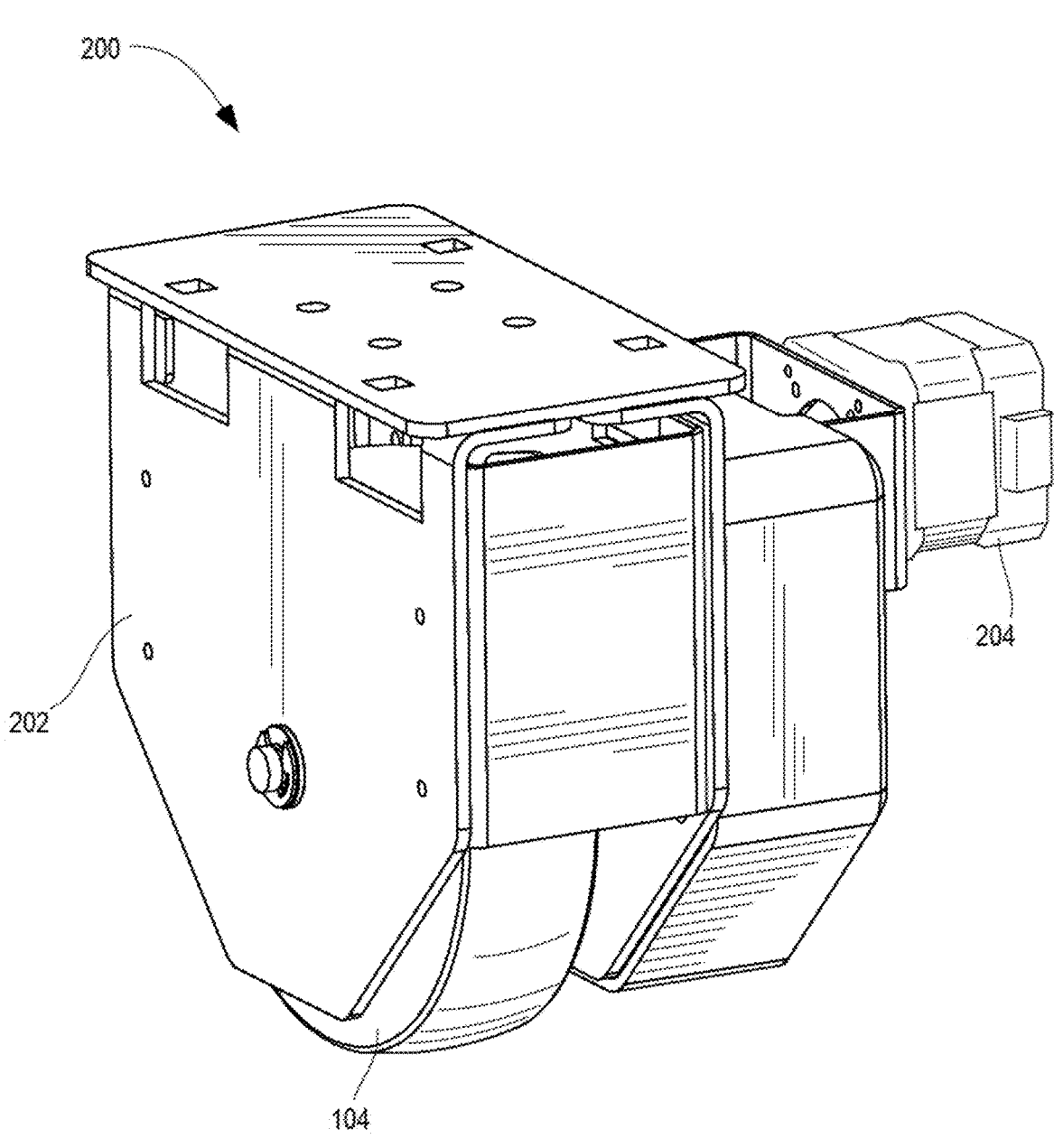
FIG. 3 is a front perspective view of a power generation system in accordance with some embodiments.
Figure 4:
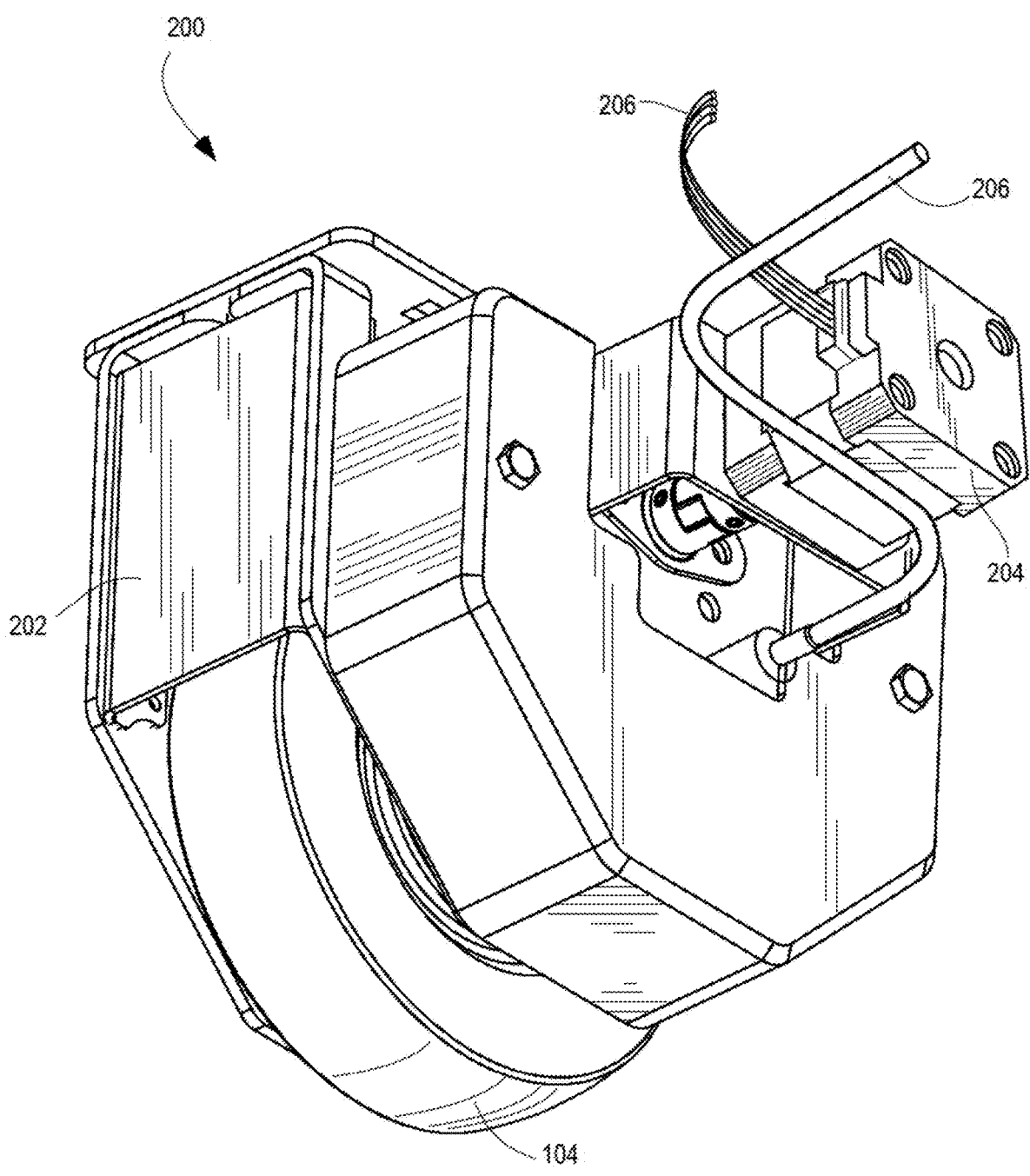
FIG. 4 is a side perspective view of a power generation system in accordance with several embodiments.

FIGS. 3 and 4 show one of the wheels 104 of the cart 102 in accordance with some embodiments. In some aspects, the wheel 104 may be part of a wheel-based power generation system 200 which includes a plurality of components which generate electrical power based on movement of the wheel 104. As shown in FIGS. 3 and 4, the power generation system 200 may include a generator 204 that generates power when the wheel 104 rotates. The power generation system 200 may further include a housing 202 surrounding any combination of the components of the power generation system 200 (FIGS. 3 and 4 show all components other than the generator 204 as being at least partially encased by the housing 202). The housing 202 may protect the power generation system 200 from external damage (e.g., blunt force, dust, fluids, etc.).

In some embodiments, the housing 202 partially encloses the wheel 104, while still allowing the wheel 104 to contact the supporting surface 116 and rotate. In some embodiments, there may be more than one housing 202 enclosing the power generation system 200, and each housing 202 may be coupled to one another. The housing 202 may include any suitable configuration, placement, and/or materials for protecting the power generation system 200. As shown in FIG. 4, the power generation system 200 may further include any number of wires 206 connected to various components of the power generation system 200. While one wire 206 is shown extending from the generator 204 and a second wire 206 is shown extending from a component within the housing 202 of the power generation system 200, there may be any alternate suitable configuration and/or number of wires 206 extending from any additional and/or alternate components of the power generation system 200.

Figure 5:
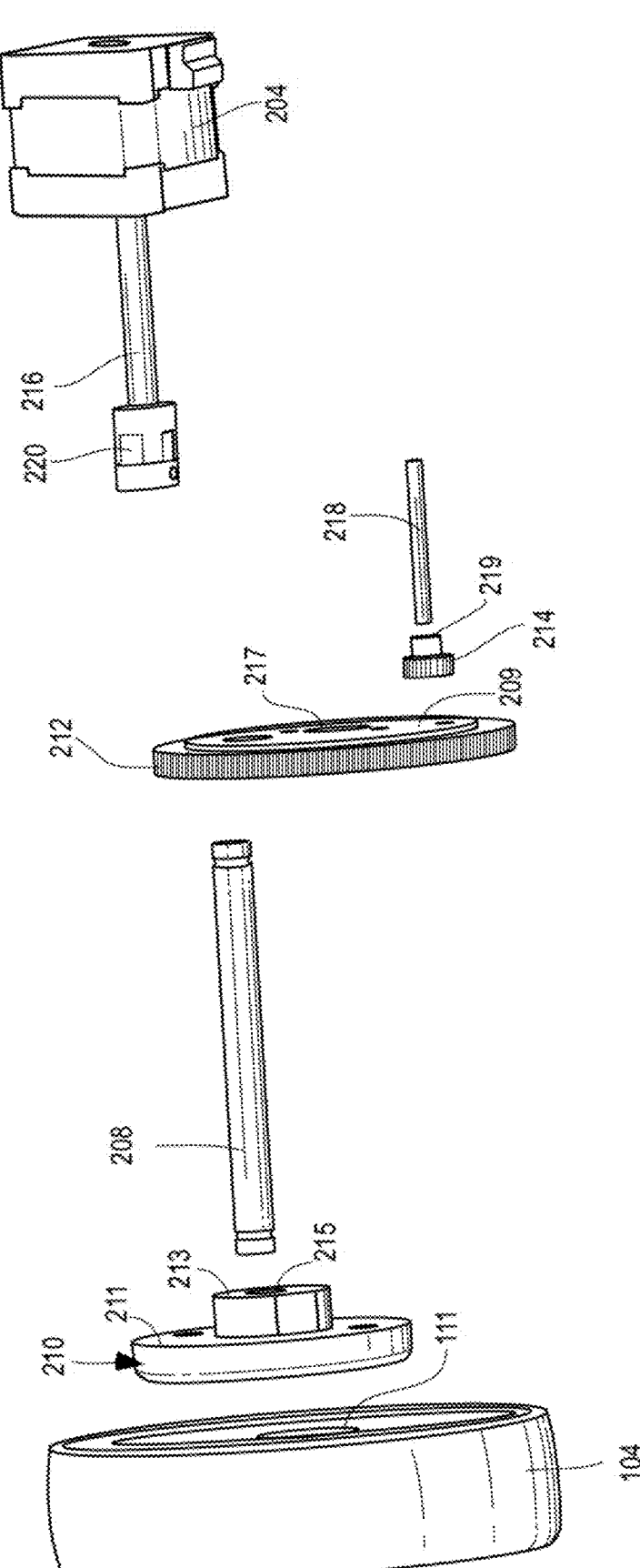
FIG. 5 is an exploded view of a power generation system in accordance with some embodiments.
Figure 6:
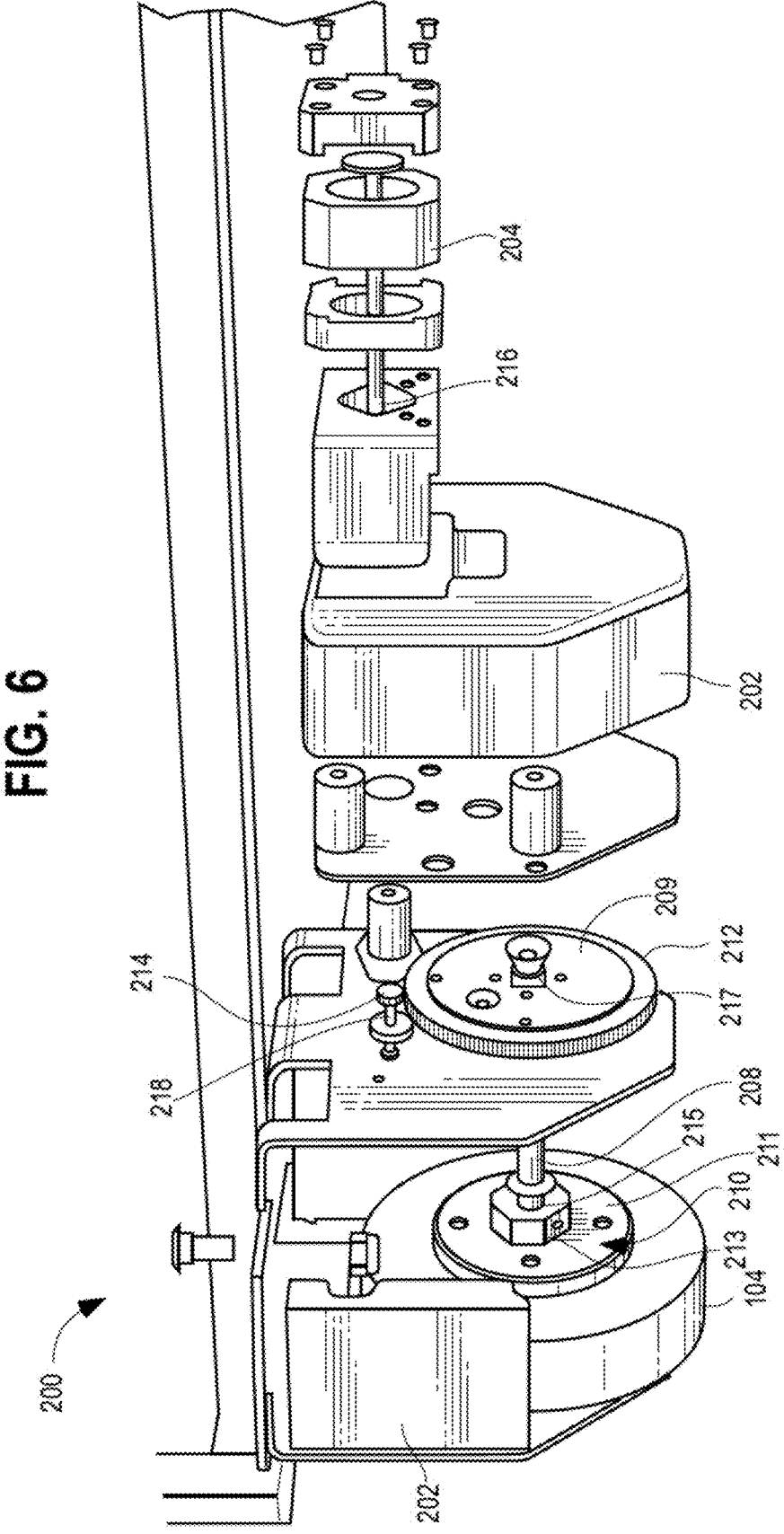
FIG. 6 is an exploded view of a power generation system in accordance with several embodiments.

FIGS. 5 and 6 show exploded views of the example power generation system 200 in accordance with some embodiments. In the illustrated embodiment, the power generation system 200 includes a wheel 104, a first shaft 208, a rotation transmitter 210, a first gear 212, a second gear 214, and a second shaft 216 that translates rotation from the wheels 104 to the generator 204 in order to generate power when the wheel 104 rotates. Generally, the power generation system 200 further includes any suitable coupling means including bearings, washers, screws, bolts, mounting plates, nuts, hubs, rings, press-fits, etc., in order to couple any combination of the components described.

In some embodiments, the first shaft 208 is coupled to the wheel 104 such that rotation of the wheel 104 causes rotation of the first shaft 208. The wheel 104 and the first shaft 208 may further be coupled to the rotation transmitter 210 which translates the rotation of the wheel 104 into the rotation of the first shaft 208. In some embodiments, the rotation transmitter 210 transmits torque to the first shaft 208 in order to facilitate smoother movement of the cart 102. The first shaft 208 may rotate with the wheel 104, or may be stationary when the wheel 104 rotates. As illustrated, the example rotation transmitter 210 is generally circular with a section 211 having a larger diameter adjacent to the wheel 104, and a section 213 with a smaller diameter adjacent to the first shaft 208 protruding out from the section 211 with the larger diameter (i.e., a smaller diameter section 213 stepped out from a larger diameter section 211).

Generally, the first shaft 208 is inserted through an opening 111 in the center of the wheel 104 and/or an opening 215 in the rotation transmitter 210 that is approximately the same size of the diameter of the first shaft 208 (i.e., creating a snug and/or tight fit between the first shaft 208 and the respective opening 111, 215). Generally, the wheels 104 and the first shaft 208 rotate in the same direction. The wheel 104 rotates in the first and second direction described above, and rotation of the wheel 104 in each of the first and second direction causes power generation by the generator 204. The first shaft 208, the rotation transmitter 210, and/or the wheels 104 may be coupled by any combination of the coupling means described above and/or with any other configuration and/or placement. The first shaft 208 may be a cylinder and/or axle with any suitable width, length, shaped cross-section, and/or material.

In some embodiments, the first gear 212 is coupled to the first shaft 208 such that rotation of the first shaft 208 causes rotation of the first gear 212. The first gear 212 may be any suitable gear such as a spur gear, helical gear, bevel gear, etc., and generally includes a plurality of teeth (i.e., equally spaced protruding features of any suitable shape and/or dimension) around the circumference of the first gear 212 which engage with additional gears and/or components. In some embodiments, an additional rotation transmitter 220 is coupled to the first shaft 208 and the first gear 212 in order to translate the rotation of the first shaft 208 into the rotation of the first gear 212. Any combination of the coupling means described above may be used to couple the first gear 212 to the first shaft 208, the first shaft 208 to an additional rotation transmitter 220, and/or the first gear 212 to an additional rotation transmitter 220.

In some embodiments, the first gear 212 includes a mounting plate 209 on either or both sides of the first gear 212, and an additional rotation transmitter 220 is coupled to either or both mounting plates 209. The additional rotation transmitter 220 may be coupled to one side and/or mounting plate 209 of the first gear 212, or the additional rotation transmitter 220 may be inserted through an opening of the first gear 212 such that the additional rotation transmitter 220 is coupled to both sides and/or mounting plates 209 of the first gear 212. In some aspects, the additional rotation transmitter 220 may rotate with the first gear 212, while in some embodiments the additional rotation transmitter 220 may be stationary as the first gear 212 rotates. The first gear 212 is generally circular and may have any suitable diameter, width, number of teeth, and/or may be made of any suitable material. The first gear 212 may be solid or may include a plurality of cutouts of any suitable spacing and/or shape. Generally, the first shaft 208 is inserted into an opening 217 generally in the center of the first gear 212 and/or an opening in the additional rotation transmitter 220 with a diameter that is the same as the diameter of the first shaft 208 (i.e., creating a snug and/or tight fit). The first shaft 208, the first gear 212, and/or the additional rotation transmitter 220 may have any alternate suitable configuration and/or placement.

In some embodiments, the second gear 214 may be coupled to the first gear 212 and rotation of the first gear 212 may cause rotation of the second gear 214. The second gear 214 may be any suitable gear such as a spur gear, helical gear, bevel gear, etc., and generally includes a plurality of teeth (i.e., equally spaced protruding features of any suitable shape and/or dimension) around the circumference of the second gear 214 which engages with additional gears and/or components. In the example embodiments shown in FIGS. 5 and 6, the first gear 212 is significantly larger than the second gear 214, though it is generally understood that any size or type of first gear 212 and/or second gear 214 may be used.

Generally, the first gear 212 and the second gear 214 are connected by respective teeth of the opposite gear. In some embodiments, the first gear 212 and the second gear 214 are connected such that the first gear 212 and the second gear 214 rotate in the same direction, while in some aspects, the first gear 212 and the second gear 214 are connected such that they rotate in opposite directions. In some embodiments, the first gear 212 and the second gear 214 create a two-gear system with the second gear 214 having a higher gear ratio in comparison to the first gear 212. The higher gear ratio generally enforces the proper gear ratio for low startup torques when movement begins. Generally, the function of the second gear 214 is to minimize torque and optimize the speed of the cart 102 as it moves by controlling the push resistance on the cart 102 as the cart 102 moves.

While two gears are shown in FIGS. 5 and 6, it is understood that any alternate number of gears may be utilized.

In some embodiments, the second shaft 216 may be coupled to the second gear 214 such that rotation of the second gear 214 causes rotation of the second shaft 216. In some embodiments, the second gear 214 is directly coupled to the second shaft 216 (i.e., the second shaft 216 is integral to the second gear 214 or inserted through an opening 219 of the second gear 214). In the embodiments shown in FIGS. 5 and 6, the second gear 214 is directly disposed about an idle shaft 218 which rotates with the second gear 214 and is consequently indirectly coupled to the second shaft 216. In some embodiments, the idle shaft 218 is coupled to the second shaft 216 by any coupling mechanism described above, while in some aspects the idle shaft 218 is coupled to the second shaft 216 by the additional rotation transmitter 220 which translates the rotation of the idle shaft 218 into the rotation of the second shaft 216.

In some embodiments, the additional rotation transmitter 220 may rotate with the idle shaft 218 and/or the second shaft 216, while in some aspects, the additional rotation transmitter 220 may be stationary while the idle shaft 218 and/or the second shaft 216 rotate. The idle shaft 218 may be inserted through an opening 219 of the second gear 214 (i.e., with a snug and/or tight fit) and/or may be integral with the second gear 214. The idle shaft 218 and/or the second shaft 216 may be a cylinder and/or axle with any suitable width, length, shaped cross-section, and/or material. In some embodiments, the idle shaft 218 and the second shaft 216 have the same dimensions. In the embodiments shown in FIGS. 5 and 6, the idle shaft 218 has a smaller diameter than the second shaft 216. While in the embodiments shown in FIGS. 5 and 6 the first shaft 208 has a larger diameter than each of the second shaft 216 and the idle shaft 218, and the idle shaft 218 has a smaller diameter than each of the second shaft 216 and the first shaft 208, it is understood that there may be any alternate suitable configuration of the dimensions of the first shaft 208, the second shaft 216, and the idle shaft 218.

In some embodiments, the generator 204 is coupled to the second shaft 216 and generates power by converting the rotation of the second shaft 216 into an alternating current power output. The second shaft 216 may be directly coupled to the generator 204 or may be coupled by any of the coupling mechanisms described above. The generator 204 may generate power when the rotation of the wheel 104 is in the first direction described, and/or when the rotation of the wheel 104 is in the second direction described. While the generator 204 shown in FIGS. 5 and 6 is generally cube shaped, the generator 204 may have any alternate suitable shape, size, dimensions, and/or configuration. The generator 204 may include any suitable power generation circuits that generate power as is well known in the art. In some embodiments, rotation of the second shaft 216 within the generator 204 causes a magnetic field to be created, which in turn creates a current which may be output by the generator 204. The current may be output from the generator 204 as the alternating current power output described. In some embodiments, the generator 204 may be any suitable generator known in the art and may output any suitable output including an alternating current power output and/or a direct current power output.

Generally, each of the rotatable components of the power generation system 200 (i.e., the wheels 104, the first shaft 208, the rotation transmitter 210, the first gear 212, the second gear 214, the second shaft 216, and/or the idle shaft 218) rotates in a first direction and a second direction opposite of the first direction. In some embodiments, each of the rotatable components rotates in the first direction when the wheel 104 rotates in the first direction. In some embodiments, each of the rotatable components rotates in the second direction when the wheel 104 rotates in the second direction. In some aspects, the rotatable components rotate in any combination of the first direction and the second direction (e.g., if the first gear 212 and the second gear 214 rotate in opposite directions the components coupled between the wheel 104 and the first gear 212 inclusive of the wheel 104 and the first gear 212 may rotate in one direction while the components coupled between and inclusive of the second gear 214 and the second shaft 216 may rotate in the opposite direction).

Generally, each of the rotatable components rotates at a rotation speed. Each component may have the same rotation speed, and/or components may have different rotation speeds. For example, due to a difference in size and/or a gear ratio, the first gear 212 and the second gear 214 may rotate with different rotation speeds. Further, the rotation transmitter 210 and/or the additional rotation transmitter 220 may monitor and/or adjust the rotation speed of a component which the rotation transmitter 210, 220 is coupled to in order to achieve rotation speeds which best facilitate power generation by the generator 204. In some embodiments, the generator 204 is configured such that certain rotation speeds of the second shaft 216 produce more power than other rotation speeds of the second shaft 216, therefore, controlling the rotation speed of the rotatable components by any suitable means (e.g., gear ratio, rotation transmitters 210, 220, etc.) may increase the amount of power generated by the generator 204 which is consequently output to charge the electronic devices 106.

Figure 7:
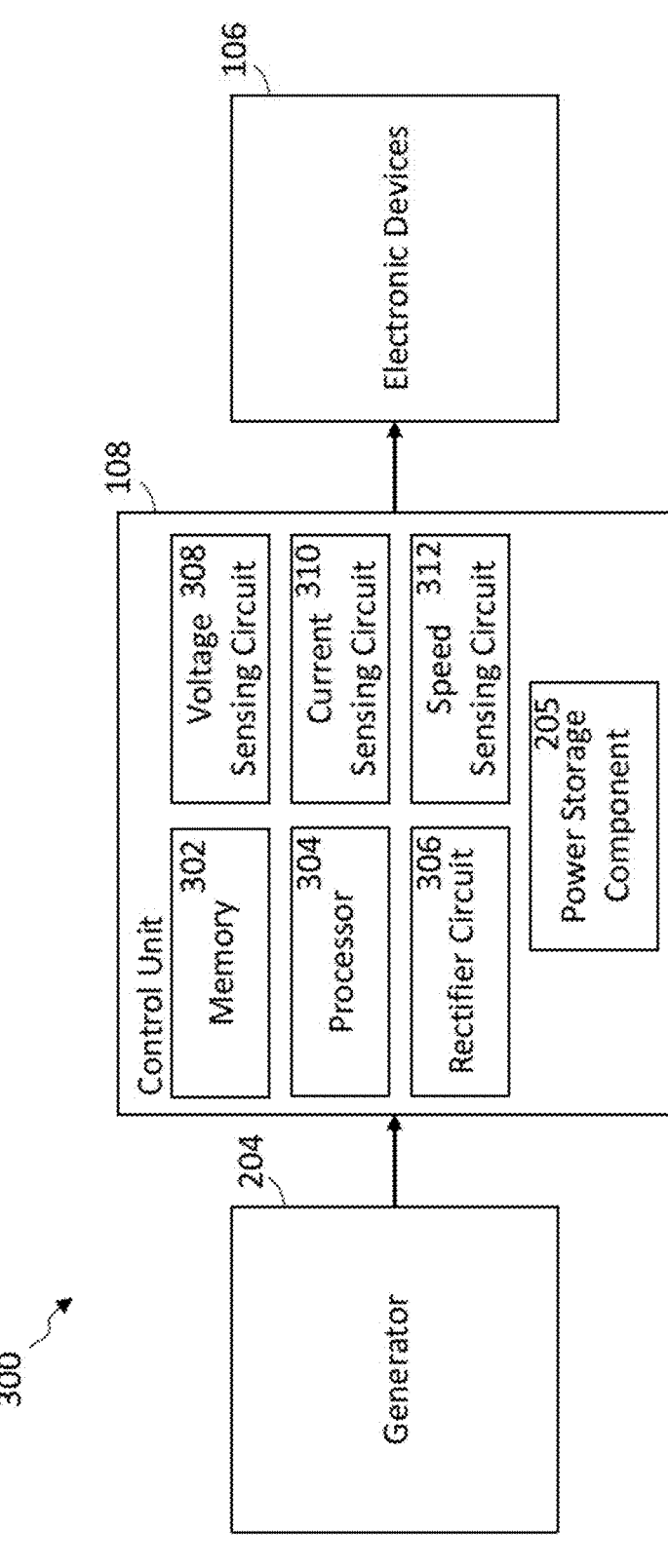
FIG. 7 is a block diagram of components of a power generation system in accordance with some embodiments.

FIG. 7 is a block diagram 300 of the generator 204, the control unit 108, a power storage component 205, and the electronic devices 106 of the cart 102 in accordance with some embodiments. In some aspects, the control unit 108 converts the alternating current power output by the generator 204 into a direct current power output. The control unit 108 may include a rectifier circuit 306, and the rectifier circuit 306 may convert the alternating current power output into the direct current power output. In some embodiments, the control unit 108 further monitors a current of the power generated by the generator 204, monitor a voltage of the power generated by the generator 204, and/or monitor a rotation speed of the second shaft 216. The generator 204 and/or the control unit 108 may include a variety of suitable components and circuits including rectifiers, buck converters, hall effect monitors (speed sensing circuits 312), logging boards, current sensing circuits 310, voltage sensing circuits 308, and/or power generation circuits which may be connected by any suitable wires, soldering, buses, etc. The circuits, circuit components, and components of the generator 204 and/or the control unit 108 are well known in the art and do not need further description herein. The control unit 108 may perform any additional and/or alternate functions suitable for generating power.

As used herein, the terms "control unit," "control circuit," and/or "controller" refer broadly to any microcontroller, computer, or processor-based device with a processor 304, memory 302, and programmable input/output peripherals, which is generally designed to govern the operation of other components and devices. These terms are further understood to include common accompanying accessory devices, including (external or internal) memory 302, transceivers for communication with other components and devices, etc. These architectural options are well known and understood in the art and require no further description here. The control unit 108, control circuit, and/or controller may (for example, by using corresponding programming stored in a memory as will be well understood by those skilled in the art) conduct one or more of the steps, actions, and/or functions described herein.

In some aspects, the power storage component 205 is coupled with the generator 204 and stores the direct current power output, and in some embodiments provides the direct current power output to the electronic devices 106 coupled to the cart 102. In some aspects, the power storage component 205 is indirectly coupled with the generator 204 via the control unit 108, such that the generator 204 is directly coupled with the control unit 108 and the control unit 108 is directly coupled with the power storage component 205. The power storage component 205 may, for example, be any suitable battery and/or storage bank. The power storage component 205 may, in some embodiments, be a part of the control unit 108, while in some aspects, the power storage component 205 may be separate from the control unit 108. For example, the control unit 108 may be located at the bottom side 114 of the cart 102 generally between the front side 110 and the back side 112 (as shown in FIG. 2) and the power storage component 205 may be disposed on the back of the component mount 107 directly adjacent the electronic devices 106, while in some aspects, the control unit 108 and the power storage component 205 may each be located on the bottom side 114 of the cart 102 generally between the front side 110 of the cart 102 and the back side 112 of the cart 102.

The control unit 108 and the power storage component 205 may have any alternate suitable configuration and/or location on the cart 102. For example, while FIG. 7 shows the power storage component 205 as being internal to the control unit 108, the power storage component 205 may be external relative to the control unit 108 in some embodiments. The power storage component 205 and/or the control unit 108 may include USB breakout circuits that allow an electronic device 106 to be charged by the power storage component 205. A charging cord for an electronic device 106 may be integral with and/or attachable to (via a USB port of the power storage component 205) the power storage component 205 on one end, and attachable to a charging port of an electronic device 106 on the other end. There may be any number of USB breakout circuits that charge any number of electronic devices 106, and while the described embodiment utilizes a USB port, any alternate suitable port for connecting to a charging cord of an electronic device 106 to the power storage component 205 may be used.

In some embodiments, the cart 102 includes any number of wire guides 109 that guide wires 206 to their intended location and attach the wires 206 to the cart 102 and may prevent the wires 206 from becoming tangled or unplugged unintentionally. The wires 206 connected to the cart 102 via the wire guides 109 may be charging cords extending from the power storage component 205 and/or control unit 108 to the electronic devices 106, and/or may be wires 206 connecting the control unit 108 to the power storage component 205 and/or other components. The wires 206 through the wire guides 109 may be any suitable wire 206 with any function necessary for the system 100. In some embodiments, the power storage component 205 stores power and charge the electronic devices 106 (i.e., when the power storage component 205 is connected to the electronic devices 106 via charging cords and/or wires 206) when the wheels 104 of the cart 102 are not actively rotating. In some embodiments, active rotation of the wheels 104 of the cart

102 causes the electronic devices 106 to be charged (i.e., not by power stored in the power storage component 205 but by power transmitted directly from the generator 204/control unit 108). Generally, the rotation of the wheel(s) 104 causes the generator 204 to generate power, and causes the power storage component 205 to store the direct current power output, and the power storage component 205 is coupled to the electronic devices 106 such that the electronic devices 106 receive and are charged by the direct current power output from the power storage component 205. In some aspects, the electronic devices 106 may be charged by power stored in the power storage component 205 when the wheel (s) 104 is (are) not actively rotating.

FIG. 8 shows a block diagram 400 of components of the system 100 in accordance with some embodiments. FIG. 8 shows the control unit 108, the electronic devices 106, and an electronic database 402 connected over a communication network 404. The electronic database 402 may include any data relevant to a user, such as product location information, product pricing information, order information, etc. The communication network 404 may be any suitable network accessible by the electronic devices 106 and/or the control unit 108 such as LAN, WLAN, PAN, VPN, MAN, WAN, SAN, etc. In some embodiments, relevant data is stored in the electronic database 402, and in order to access the data, the electronic devices 106 access the communication network 404 and in turn the data in the electronic database 402 via the communication network 404. The electronic database 402 may additionally hold data and/or instructions used by the control unit 108, and the control unit 108 may similarly access the data in the electronic database 402 via the communication network 404. Any additional systems, components, databases, etc., may further be cooperated with one another via the communication network 404.

FIG. 9 shows an example method 900 of wheel-based power generation on a retail cart for charging one or more electronic devices coupled to the cart. It is generally contemplated that the method 900 may use some or all of the components described above, such as, for example, components of the cart and power generation system described above. At block 902, the method 900 includes rotating at least one wheel coupled to a drive shaft. In some aspects, the at least one wheel rotates in multiple directions including a first direction and a second direction opposite of the first direction, and the at least one wheel is coupled to the drive shaft such that rotation of the at least one wheel causes rotation of the drive shaft. In some aspects, the method 900 may include providing the cart with at least one additional wheel that does not generate power during rotation of the at least one additional wheel. At block 904, the illustrated method 900 further includes translating, by a rotation transmitter coupled to the wheel, the rotation of the wheel into rotation of the drive shaft. At block 906, the method 900 further includes causing, by the rotation of the drive shaft, a rotation of a first gear coupled to the drive shaft. At block 908, the method 900 further includes causing, by the rotation of the first gear, rotation of a second gear coupled to the first gear. At block 910, the method 900 further includes causing, by the rotation of the second gear, a rotation of a shaft coupled to the second gear.

At block 912, the method 900 further includes generating, by a generator coupled to the shaft, power by converting the rotation of the shaft into an alternating current power output when the rotation of the at least one wheel is present. In some aspects, the generator generates power when the rotation of the wheel is in the first direction and when the rotation of the wheel is in the second direction. At block 914, the method 900 further includes converting, by a control unit, the alternating current power output into a direct current power output. In some aspects, the method 900 further includes providing the control unit with a rectifier circuit, and the rectifier circuit converts the alternating current power output into the direct current power output. In certain aspects, the method 900 may further include the control unit monitoring a current of the power generated by the generator, monitoring a voltage of the power generated by the generator, and/or monitoring a rotation speed of the shaft. At block 916, the method 900 further includes storing, by a power storage component coupled to the generator, the direct current power output. In some aspects, the power storage component provides the direct current power output to the one or more electronic devices coupled to the cart, and in some embodiments, the one or more electronic devices include at least one of a smartphone, a tablet, a scanner, and/or a printer.

In some aspects, the method 900 further includes providing a housing enclosing the at least one wheel. The method 900 may further include providing the cart with at least one wheel coupled to the cart, providing the cart with one or more electronic devices coupled to the cart, moving the cart via the at least one wheel, and rotating the at least one wheel to move the cart and cause the charging of the electronic devices coupled to the cart. In some embodiments, the method 900 further includes causing, by movement of the cart, the rotation of the at least one wheel, causing, by the rotation of the at least one wheel, the generator to generate the power, and the power storage component to store the direct current power output, receiving, by the electronic devices coupled to the power storage component, the direct current power output, and charging, by the direct current power output, the electronic devices.

Generally, the process of utilizing electronic devices in a retail environment requires extensive amounts of time designated for charging the electronic devices. This lowers productivity and efficiency as instead of being able to use the electronic devices consistently, associates are required to manually swap out the batteries of the electronic devices and/or the electronic devices themselves, which takes a significant amount of time. Additionally, the electronic devices are generally not mountable to carts as they need to be moveable in order to be charged at a variety of locations as needed. Having electronic devices not mounted to something and having to be manually handled by workers further increases the likelihood of an electronic device getting lost as it is transferred from one place to another. Generating power directly on a cart and utilizing the power to charge electronic devices mounted on the cart advantageously reduces revenue loss from equipment loss and increases productivity and efficiency as it is not required to swap out batteries and/or electronic devices to be charged during use. Specifically, during power generation, the inclusion of a rotation transmitter advantageously translates motion to help facilitate smooth movement of the wheels and cart. Further, the 2-gear system comprising a first larger gear and a second smaller gear, the second gear having a high gear ratio, advantageously minimizes torque to control the push resistance on the cart and optimize walking speed of a user pushing the cart. Utilizing a generator that is able to generate power with rotation of the wheel in both a first and second direction increases the amount of power able to be generated and consequently used by the system.

Those skilled in the art will recognize that a wide variety of other modifications, alterations, and combinations can also be made with respect to the above-described embodiments without departing from the scope of the disclosure, and that such modifications, alterations, and combinations are to be viewed as being within the ambit of the inventive concept.

The invention claimed is:

1. A system of wheel-based power generation on a cart for transporting commercial products, the system comprising:
    at least one wheel that rotates in multiple directions including a first direction and a second direction opposite of the first direction;
    a first shaft, wherein the at least one wheel is coupled to the first shaft, and wherein rotation of the at least one wheel causes rotation of the first shaft;
    a rotation transmitter coupled to the at least one wheel and the first shaft, wherein the rotation transmitter translates the rotation of the at least one wheel into the rotation of the first shaft;
    a first gear coupled to the first shaft, wherein the rotation of the first shaft causes rotation of the first gear;
    a second gear coupled to the first gear such that the rotation of the first gear causes rotation of the second gear;
    a second shaft coupled to the second gear, wherein the rotation of the second gear causes rotation of the second shaft;
    a housing that encloses at least a portion of the at least one wheel, rotation transmitter, first gear, second gear, first shaft, and second shaft, wherein the housing includes a first housing portion and a second housing portion coupled to the first housing portion, wherein the first housing portion encloses at least a portion of the at least one wheel, rotation transmitter and first shaft, and wherein the second housing portion encloses at least a portion of the first gear, second gear, first shaft, and second shaft;
    a generator coupled to the second shaft, wherein the generator generates power by converting the rotation of the second shaft into an alternating current power output when the rotation of the at least one wheel is present;
    a control unit coupled to the generator, wherein the control unit converts the alternating current power output into a direct current power output; and
    a power storage component coupled to the generator, wherein the power storage component stores the direct current power output.

2. The system of claim 1, wherein the generator generates the power when the rotation of the at least one wheel is in the first direction and when the rotation of the at least one wheel is in the second direction.

3. The system of claim 1, wherein the power storage component provides the direct current power output to one or more electronic devices coupled to the cart.

4. The system of claim 3, wherein the one or more electronic devices include at least one of a smartphone, a tablet, a scanner, and a printer.

5. The system of claim 1, wherein the control unit comprises a rectifier circuit, and wherein the rectifier circuit converts the alternating current power output into the direct current power output.

6. The system of claim 1, wherein the control unit:
    monitors a current of the power generated by the generator;
    monitors a voltage of the power generated by the generator; and
    monitors a rotation speed of the second shaft.

7. The system of claim 1, further comprising:

the cart coupled to the at least one wheel; and one or more electronic devices coupled to the cart;

wherein the rotation of the at least one wheel moves the cart and causes charging of the one or more electronic devices coupled to the cart.

8. The system of claim 7, wherein the cart is further coupled to at least one additional wheel that does not generate power during rotation of the at least one additional wheel.

9. The system of claim 7, wherein movement of the cart causes the rotation of the at least one wheel;

wherein the rotation of the at least one wheel causes the generator to generate the power and causes the power storage component to store the direct current power output; and wherein the power storage component is coupled to the one or more electronic devices such that the one or more electronic devices are charged by the direct current power output from the power storage component.

10. A method of wheel-based power generation on a cart for transporting commercial products, the method comprising:

rotating at least one wheel, wherein the at least one wheel rotates in multiple directions including a first direction and a second direction opposite of the first direction, and wherein the at least one wheel is coupled to a first shaft such that rotation of the at least one wheel causes rotation of the first shaft;

translating, by a rotation transmitter coupled to the at least one wheel, the rotation of the at least one wheel into the rotation of the first shaft;

causing, by the rotation of the first shaft, rotation of a first gear coupled to the first shaft;

causing, by the rotation of the first gear, rotation of a second gear coupled to the first gear;

causing, by the rotation of the second gear, rotation of a second shaft coupled to the second gear;

enclosing, by a housing, at least a portion of the at least one wheel, rotation transmitter, first gear, second gear, first shaft, and second shaft, wherein the housing includes a first housing portion and a second housing portion coupled to the first housing portion, wherein the first housing portion encloses at least a portion of the at least one wheel, rotation transmitter and first shaft, and wherein the second housing portion encloses at least a portion of the first gear, second gear, first shaft, and second shaft;

generating, by a generator coupled to the second shaft, power by converting the rotation of the second shaft into an alternating current power output when the rotation of the at least one wheel is present;

converting, by a control unit coupled to the generator, the alternating current power output into a direct current power output; and storing, by a power storage component coupled to the generator, the direct current power output.

11. The method of claim 10, further comprising generating the power by the generator when the rotation of the at least one wheel is in the first direction and when the rotation of the at least one wheel is in the second direction.

12. The method of claim 10, further comprising providing, by the power storage component, the direct current power output to one or more electronic devices coupled to the cart.

13. The method of claim 12, wherein the one or more electronic devices include at least one of a smartphone, a tablet, a scanner, and a printer.

14. The method of claim 10, further comprising:

providing the control unit with a rectifier circuit; and converting, by the rectifier circuit, the alternating current power output into the direct current power output.

15. The method of claim 10, further comprising:

monitoring, by the control unit, a current of the power generated by the generator;

monitoring, by the control unit, a voltage of the power generated by the generator; and monitoring, by the control unit, a rotation speed of the second shaft.

16. The method of claim 10, further comprising:

providing the cart coupled to the at least one wheel;

providing one or more electronic devices coupled to the cart; and rotating the at least one wheel to move the cart and cause charging of the one or more electronic devices coupled to the cart.

17. The method of claim 16, wherein the cart is further coupled to at least one additional wheel that does not generate power during rotation of the at least one additional wheel.

18. The method of claim 16, further comprising:

causing, by movement of the cart, the rotation of the at least one wheel;

causing, by the rotation of the at least one wheel, the generator to generate the power and the power storage component to store the direct current power output;

charging, by the direct current power output, the one or more electronic devices.

\* \* \* \* \*